United States Patent
Gottlieb et al.

(10) Patent No.: US 11,630,941 B1
(45) Date of Patent: Apr. 18, 2023

(54) MICRO FRONTENDS

(71) Applicant: monday.com Ltd., Tel Aviv (IL)

(72) Inventors: Orr Gottlieb, Ramat HaSharon (IL); Vlad Mystetskyi, Ashdod (IL); Moshe Zemah, Rishon LeZion (IL)

(73) Assignee: monday.com Ltd., Tel Aviv (IL)

( * ) Notice: Subject to any disclaimer, the term of this patent is extended or adjusted under 35 U.S.C. 154(b) by 0 days.

(21) Appl. No.: 17/565,725

(22) Filed: Dec. 30, 2021

(51) Int. Cl.
*G06F 40/143* (2020.01)
*G06F 3/0481* (2022.01)

(52) U.S. Cl.
CPC .......... *G06F 40/143* (2020.01); *G06F 3/0481* (2013.01)

(58) Field of Classification Search
CPC .............................. G06F 40/143; G06F 3/0481
See application file for complete search history.

(56) References Cited

U.S. PATENT DOCUMENTS

| | | | |
|---|---|---|---|
| 10,162,624 B1* | 12/2018 | Moturu | G06F 9/45529 |
| 10,678,600 B1* | 6/2020 | Darling | G06F 8/70 |
| 2008/0228880 A1* | 9/2008 | Naresh | G06Q 10/107 |
| | | | 709/206 |
| 2011/0010379 A1* | 1/2011 | Gilderman | G06F 16/252 |
| | | | 707/769 |
| 2011/0265011 A1* | 10/2011 | Taylor | G06F 3/0484 |
| | | | 715/751 |
| 2019/0354266 A1* | 11/2019 | Wu | G06F 9/451 |
| 2020/0389505 A1* | 12/2020 | Bailey | H04W 4/00 |
| 2021/0064675 A1* | 3/2021 | Chugh | G06F 40/14 |
| 2021/0248205 A1* | 8/2021 | Tank | G06F 16/986 |
| 2022/0114214 A1* | 4/2022 | Reddymakireddy | |
| | | | G06F 9/44521 |

* cited by examiner

*Primary Examiner* — Keith D Bloomquist (57) ABSTRACT

A host-side system for displaying a web page includes at least one processing circuitry which discovers at least one micro frontend in web page code. Each micro frontends has a respective type, internal or external. Internal micro frontends are inline with the web page code and external micro frontends are hosted in a frame in the web page code. A host application is executed for rendering the web page. Data exchange between the host application and the micro frontends is managed using a micro frontend layer in accordance with the respective types of the micro frontends.

27 Claims, 4 Drawing Sheets

MICRO FRONTENDS

FIELD AND BACKGROUND OF THE INVENTION

The present invention, in some embodiments thereof, relates to a web application and, more particularly, but not exclusively, to a web application with micro frontends.

Monolith code for a web application may become difficult to update and maintain over time, especially when the web application includes many features for user interaction. Recently micro frontend architectures have become recognized as a possible solution for easing these problems. Micro frontend is a development methodology that enables the development of different user interface (UI) parts with little to no relation to the containing host.

However implementing micro frontend architecture raises new difficulties and challenges. It may be difficult to integrate multiple micro frontends with the host application so as to provide a cohesive user experience (UX). This task is particularly difficult when some of the micro frontends originate from external sources.

SUMMARY OF THE INVENTION

It is an object of the present disclosure to describe an apparatus, a method and a computer program product which provide seamless communication between a host application and both internal and external micro frontends embedded in a web page.

In the micro frontend architecture paradigm, the user interface (UI) of a web application includes micro frontends which define portions of the overall UI in a way that is transparent to the user. For example a micro frontend could be the UI of a sub-application of a web service. In another example a micro frontend could be a component of a web page, such as a window or menu.

On the client side the user interacts with the host application using what appears to be a single UI. However on the host side the UI includes one or more independent micro frontends which are integrated to form a uniform UI.

Embodiments described in the present disclosure relate to two types of micro frontends (MFs): internal MFs and external MFs. Internal MFs are inline with the host application. Typically internal MFs are written by internal developers of the main application. External MFs are hosted in a frame (e.g. iFrame or portal) and may be written by external developers and/or internal developers.

A micro frontend layer manages interactions between the host and the MFs based on the type of micro frontend (MF) in a manner that is transparent to the user. For example, the MF layer may limit external MF privileges and data access relative to internal MFs.

By coordinating data exchange between the host application and internal and external MFs, the MF layer ensures that seamless communication is achieved regardless of whether the MF is internal or external.

According to a first aspect of some embodiments of the present invention there is provided a host-side system for displaying a web page. The host-side system includes at least one processing circuitry configured for:
  discovering at least one micro frontend in web page code, each of the at least one micro frontends having a respective type, the types being internal micro frontend and external micro frontend, wherein internal micro frontends are inline with the web page code and external micro frontends are hosted in a frame in the web page code;
  executing a host application configured for rendering the web page; and
  using a micro frontend layer, managing data exchange between the host application and the micro frontends in accordance with a respective type of the micro frontend.

According to a second aspect of some embodiments of the present invention there is provided method for displaying a web page. The method includes:
  at a host-side of a web application, discovering at least one micro frontend in web page code, each of the at least one micro frontends having a respective type, the types being internal micro frontend and external micro frontend, wherein internal micro frontends are inline with the web page code and external micro frontends are hosted in a frame in the web page code;
  executing a host application configured to render the web page; and
  using a micro frontend layer to manage data exchange between the host application and the at least one micro frontend in accordance with a respective type of the micro frontends.

According to a third aspect of some embodiments of the present invention there is provided a computer program comprising program instructions which, when executed by a processor, cause the processor to carry out the method of the second aspect of the invention.

According to some embodiments of the first, second and third aspects of the invention, only static data is exchanged between the host application and external micro frontends, and data exchanged between the host application and internal micro frontends may be dynamic data and/or static data.

According to some embodiments of the first, second and third aspects of the invention, the micro frontend layer initializes the at least one micro frontend upon discovery.

According to some embodiments of the first, second and third aspects of the invention, the micro frontend layer includes an application programming interface (API) configured for facilitating messaging amongst the host application and the at least one micro frontend in accordance with the respective type.

According to some embodiments of the first, second and third aspects of the invention, external data for rendering at least one external micro frontend is obtained from a client.

According to some embodiments of the first, second and third aspects of the invention, external micro frontends are identified in the web page code by at least one mark.

According to some embodiments of the first, second and third aspects of the invention, the web page is in HyperText Markup Language (HTML) page and external micro frontends are hosted in the code in an inline frame (iFrame) or portal.

According to some embodiments of the first, second and third aspects of the invention, discovering at least one micro frontend in web page code includes identifying respective most recent versions of the micro frontends.

According to some embodiments of the first, second and third aspects of the invention, discovering at least one micro frontend in web page code includes determining respective paths to the micro frontends.

According to some embodiments of the first, second and third aspects of the invention, the micro frontend layer is configured to communicate to the host whether a micro frontend is internal or external.

According to some embodiments of the first, second and third aspects of the invention, the micro frontend layer is configured for managing privileges for the at least one micro frontend.

According to some embodiments of the first, second and third aspects of the invention, the micro frontend layer is configured for limiting access of one external micro frontends to at least some capabilities of the host application.

According to some embodiments of the first, second and third aspects of the invention, internal micro frontends have access to all capabilities of the host application.

According to some embodiments of the first, second and third aspects of the invention, the host application specifies at least one location on the web page for rendering a respective micro frontend.

According to some embodiments of the first, second and third aspects of the invention, at least one of the micro frontends comprises an element for user interaction.

According to some embodiments of the first, second and third aspects of the invention, the web page is rendered for display and provided to a client device over a network.

According to some embodiments of the first, second and third aspects of the invention, a common development tool is provided for developing internal and external micro frontends. Access to at least one capability of the host application is available for development of internal micro frontends and blocked for development of external micro frontends.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

Various embodiments are described herein with reference to a system, method, device, or computer readable medium. It is intended that the disclosure of one is a disclosure of all. For example, it is to be understood that disclosure of a computer readable medium described herein also constitutes a disclosure of methods implemented by the computer readable medium, and systems and devices for implementing those methods, via for example, at least one processor. It is to be understood that this form of disclosure is for ease of discussion only, and one or more aspects of one embodiment herein may be combined with one or more aspects of other embodiments herein, within the intended scope of this disclosure.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to a web application and, more particularly, but not exclusively, to a web application with micro frontends.

Web applications are prevalent and provide a wide variety of services to remote clients. The micro frontend architecture has many benefits for web application development, including faster development, simple scalability and deployment independence. Different micro frontends may be developed by different teams and may even be provided by external sources.

Embodiments of the host-side system described herein utilize two types of micro frontends. Internal micro frontends are inline with web page code and external micro frontends are embedded in frames. It is important to control the access of each micro frontend to host system resources, particularly when the micro frontend is obtained from an external source. Additionally, it is desired to maintain smooth and consistent communication between the host and the micro frontends. Maintaining this consistency is particularly challenging in the micro frontend approach because the different micro frontends may have been developed by different teams, in different languages and with different design methodologies.

To solve this problem, embodiments of the invention use a micro frontend layer at the host side. The micro frontend layer manages data exchange between the host application and the internal and external micro frontends. The micro frontend layer ensures consistent interaction between the host application and the various micro frontends and may controls micro frontend privileges and access to host resources.

Figure 1:
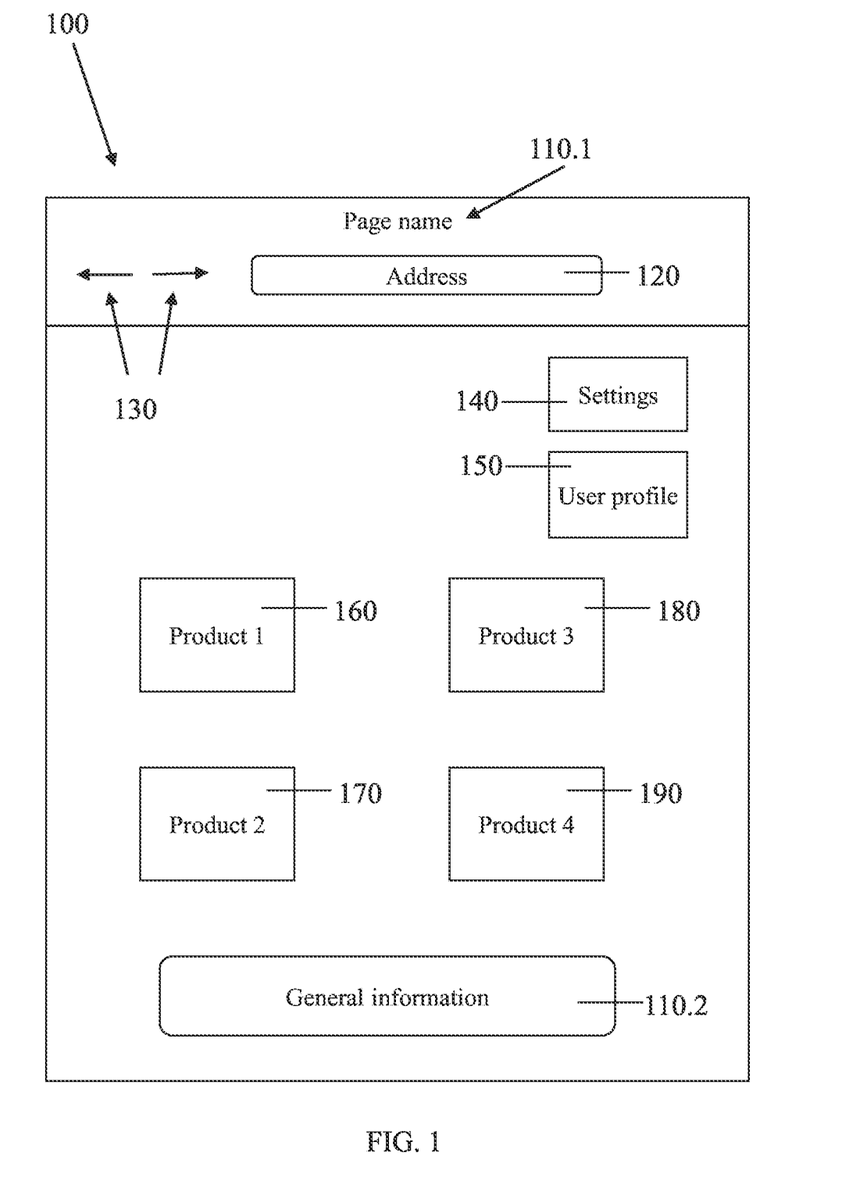
FIG. 1 is a simplified example of a web page for a shopping application.

Reference is now made to FIG. 1, which is a simplified example of a web page for a shopping application and which includes internal and external micro frontends.

Web page 100 is rendered by a host application and is accessible to a client device over a network. Web page 100 includes common page elements (page name 110.1 and general information 110.2) which may be rendered by the host application as part of the monolith. Address window 120, back and forward arrows 130, Settings 140 and User profile 150 are implemented as internal MFs. Product 1-Product 4 (160-180 respectively) are implemented as external MFs. Note that web page 100 may itself be a MF which integrates MFs 120-180 within it.

The user interacts with the host application using a client device which communicates with the host application over the network. The web page is displayed on a client-side display, either integrated into the client device or connected to the client device. Examples of user operations using a web page graphical user interface (GUI) include entering and deleting data in a table or data field, selecting an item from a list or menu, clicking on a link, clicking on an image to zoom in and so forth.

Optionally, when the web page is rendered, a host application puts a container element on the web page, with an ID that is unique to each MF. This container is where the MF renders itself.

Optionally, a MF is rendered based on associated data such as files and scripts. Further optionally, external MFs are rendered based on data imported from a client side application.

As used herein the terms "host application" and "host" mean an application that controls how a web page is rendered. Optionally the host maintains data (e.g. states) for the MFs and/or provides resources for use by the MFs. The host application may be accessed by client devices over a network.

As used herein the term "host-side system" means a system that is not running on a client device.

As used herein the terms "micro frontend" and "MF" mean self-contained web page code for a portion of the host application's front end.

As used herein the term "internal micro frontend" means a micro frontend that is inline with the web page code.

As used herein the term "external micro frontend" means a micro frontend that is embedded in a frame within the web page code.

As used herein the terms "micro frontend layer" and "MF layer" mean an interface layer between the host application and micro frontends.

Figure 2:
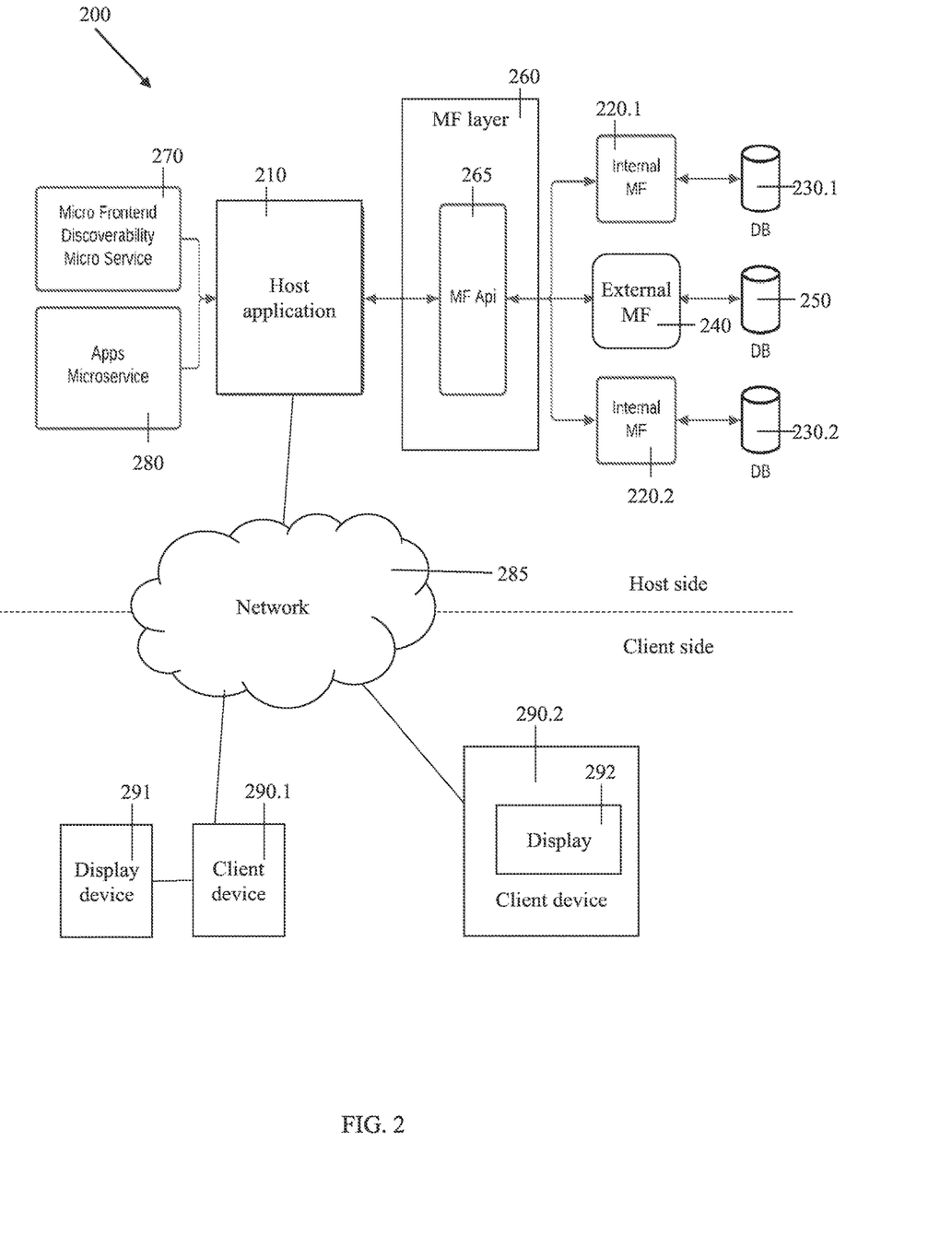
FIG. 2 is a simplified block diagram of a micro frontend system architecture, according to some exemplary embodiments of the present disclosure.

Reference is now made to FIG. 2, which is a simplified block diagram of a micro frontend system architecture, according to some exemplary embodiments of the present disclosure. FIG. 2 illustrates a non-limiting architecture having two internal MFs and one external MF. As will be appreciated by the skilled person, the number of both internal and external MFs may differ from those in FIG. 2.

Host-side micro frontend system 200 includes host application 210, internal MFs 220.1-220.2, external MF 240 and MF layer 260.

Host application 210 contains and renders the MFs in respective specified locations.

Internal MFs 220.1-220.2 are MFs which are inline with the web page code. Optionally, internal MFs 220.1-220.2 are connected to respective databases 230.1-230.2. The databases store data needed to render the associated internal MF.

External MF 240 is embedded within a frame in the web page code, and is optionally connected to database 250 which stores data needed to render the external MF.

MF layer 260 runs in the background and is in charge of managing operations required for the rendering of detected MFs. Some of these operations may occur before rendering the web page is triggered (e.g. during idle). MF layer 260 may include MF application programming interface (API) 265.

Host application 210 is a web application accessible over network 285 by one or more client devices. The client devices establish sessions with the host application over the network. For clarity, FIG. 2 shows two client devices 290.1 and 290.2. As will be appreciated, the number of client devices holding remote sessions with host application 210 may be much larger. Client device 290.1 is connected to external display device 291 which displays the web page obtained by client device 290.1 from host application 210. Client device 290.2 has an internal display 292 which displays the web page obtained by client device 290.2 from host application 210.

Optionally, internal micro frontends have access to all host application data and may access it and possibly modify it directly. External MFs do not have direct access to host application data and other information. For external MFs, the data is received by messaging with the host application, either as data provided by the host application in response to a request or in a message originating from the host.

Optionally, the MF layer is a logic layer between the host application and the graphical user interface (GUI).

Optionally, the MF layer performs one or more additional operation, examples of which are given below.

In one example, the MF layer manages data transfer between the host application and the micro frontends. Data exchanged between the host application and external MFs is static only. Data exchanged between the host application and internal MFs may be static data (with no capabilities) or dynamic data. The dynamic data may include capabilities such as: a GUI element, functions, functions written by one developer but used by another and so forth.

In another example, the MF layer initializes one or more internal and/or external MFs.

In another example, the MF layer exposes different abilities from the host to each MF.

In another example, the MF layer manages privileges for external MFs (e.g. view only, edit, etc.). Optionally, internal MFs have all the privileges as the host application.

In another example, the MF layer holds an abstraction to communicate whether code of a given MF is inline or in a frame (e.g. iFrame or portal).

Optionally, when the web page is displayed, an internal MF accesses data and renders at a selected location or the host fetches the data and renders the internal MF. For an external MF, the host renders the MF.

These differences affect how the web page is rendered for display but are completely transparent to the user.

Optionally, multiple MFs are nested (where the code of a first MFs includes code for a second MF).

Certain embodiments disclosed herein include devices, systems, and methods for collaborative work systems that may allow a user to interact with information in real time. The host application platform allows a user to interact with the collaborative work system using a client device, which connects to the collaborative work system over a network. The interaction may be performed using the GUI displayed on the client device.

User interaction may be performed in many ways, for example using the same building blocks to represent what the user wants to manage and how the user wants to manage it. This may be accomplished through the use of boards. A board may be a table with items (e.g., individual items presented in horizontal rows) defining objects or entities that are managed in the platform (task, project, client, deal, etc.). In some embodiments, a board may contain information beyond which is displayed in a table. Boards may include sub-boards that may have a separate structure from a board.

Sub-boards may be tables with sub-items that may be related to the items of a board. For example, in some embodiments, dashboards may be utilized to present or summarize data derived from one or more boards. A dashboard may be a non-table form of presenting data, using for example static or dynamic graphical representations. A dashboard may also include multiple non-table forms of presenting data, such representations may include various forms of graphs or graphics. In some instances, dashboards (which may also be referred to more generically as "widgets") may include tablature. Software links may interconnect one or more boards with one or more dashboards thereby enabling the dashboards to reflect data presented on the boards. This may allow, for example, data from multiple boards to be displayed and/or managed from a common location. These widgets may provide visualizations that allow a user to update data derived from one or more boards.

In one example, one or more boards are MFs. Each board MF has a respective type which may be determined from the web page code (internal or external), and is managed by the MF layer according to its type as described in more detail below.

In another example, one or more sub-boards are MFs. Each sub-board MF has a respective type (internal or external) and is managed by the MF layer according to its type as described in more detail below.

In yet another example, one or more widgets are MFs. Each widget MF has a respective type, namely internal MF or external MF.

In some instances, the associated MF sets permissions to limit board access to the board's "owner" while in other embodiments a user's board may be accessed by other users. When one user makes a change in a board, that change may be updated to the board stored in a memory or repository and may be pushed to the other user devices that access that same board. These changes may be made to cells, items, columns, boards, dashboard views, logical rules, or any other data associated with the boards. Similarly, when cells are tied together or are mirrored across multiple boards, a change in one board may cause a cascading change in the tied or mirrored boards or dashboards of the same or other owners.

Figure 3:
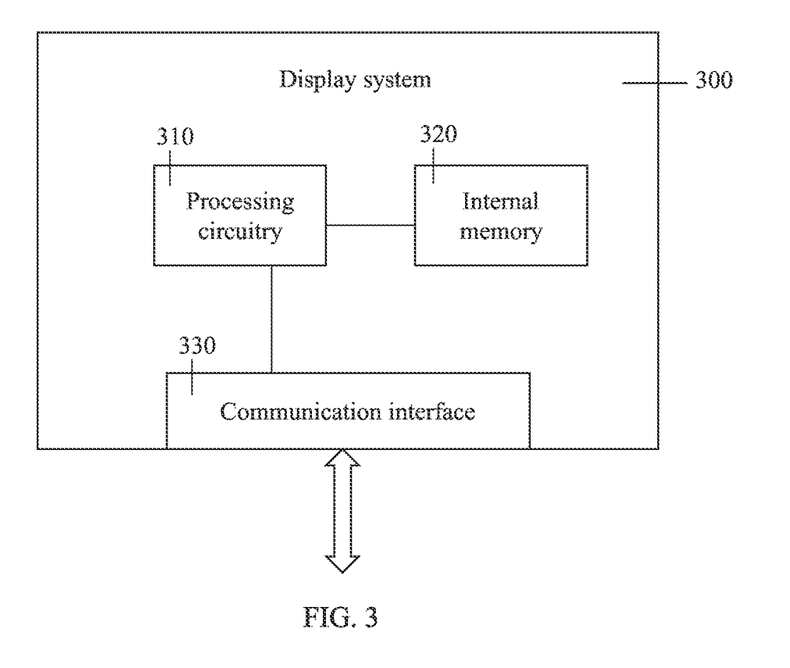
FIG. 3 is a simplified block diagram of a web page display system, according to embodiments described in the present disclosure.

Reference is also made to FIG. 3, which is a simplified diagram of a web page display system, according to embodiments described in the present disclosure. Web page display system 300 (also denoted herein display system 300) includes processing circuitry 310 running on the host-side. Processing circuitry 310 may include one or more hardware processors running on the same or different devices. Processing circuitry 310 may be deployed on one or more machines, including but not limited to hardware server(s) and/or web server(s) and/or virtual machine(s) and/or container environment(s) running on hardware machine(s). Each of the machines may include one or more processors.

Optionally, the host application and the MF layer run on the same machine (virtual or hardware). Alternately, the host application and the MF layer run on different machines.

The host application may use a centralized or distributed system architecture. Similarly, the MF layer may use a centralized or distributed system architecture.

Optionally, display system 300 includes additional hardware elements. Examples of such hardware elements include but are not limited to internal memory 320 and communication interface 330.

Internal memory 320 stores software instructions to be executed by processing circuitry 310 and/or web page code and/or other data.

Communication interface 330 communicates over a network with client devices. Optionally, the rendered web page is provided via communication interface 330 for display on a hardware client display or display device.

Processing circuitry 310 performs the processing operations required by the micro frontend system, as described below.

In some embodiments disclosed herein, web page code is scanned in order to discover if it includes any micro frontends. Internal micro frontends are inline with the web page code and external micro frontends are hosted in a frame in the web page code. Optionally, the web page code is HyperText Markup Language (HTML) and the external micro frontend is hosted in an iFrame or portal.

Optionally, discovering MFs in the web page code includes identifying the most recent versions of the MFs and/or determining respective paths to the MFs.

For the purpose of completeness, the following description describes the case in which both internal MF(s) and external MF(s) are discovered on the web page. However if only one type of MF or no MFs are found on the web page only the operations required for the single type of MF or for no MF will be performed.

The host application for rendering the web page is executed. Optionally, the host application specifies respective locations on the web page for rendering the internal and external MFs.

For example, the host application may first render an empty element at the location designated for a MF, then request all files (such scripts) required to render the MF. The MF is initialized with abilities and permissions. Finally the empty element is replaced by the initialized MF.

Optionally, each of the MFs is rendered using respective data. Internal MFs may be rendered using internal data directly accessible by or on the host application. External MFs may be rendered by external data obtained from a client.

Optionally, when a web page is accessed by a client device, the host application renders the web page for display and provides the rendered page to the client device over a network.

The MF layer manages data exchange between the host application and the micro frontends in accordance with the respective type of the micro frontend.

Non-limiting examples of data exchange management by the MF layer are now presented.

In one example, the MF layer includes an API that facilitates communication with amongst the host, internal MF(s) and external MF(s).

In another example, the MF layer communicates to the host whether a micro frontend is internal or external. The API may hold an abstraction to communicate whether the MF is inline or in an iFrame.

In another example, the MF layer formats messages transferred between the host application and the MF based on the type of the MF (internal or external). For example, dynamic elements in messages to/from an external MF may be blocked.

In another example, the MF layer manages privileges and access to host resources for external micro frontend(s). Managing privileges may be token-based as known in the art. Optionally, internal MFs have the same privileges as the host.

In another example, the MF layer limits access of external micro frontend(s) to capabilities of the host application. Optionally, the MFs share a common API object in which some interfaces are blocked to external MFs.

Optionally, at least one external MF is run in the sandbox, thus controlling the resources available to the external MF.

Optionally, at least one of the micro frontends includes an element for user interaction, such as a link, drop down box, menu or any other page element with which the user may interact.

Optionally, a common development tool is provided for developing both internal and external micro frontends. Access to at least one capability of the host application is blocked for development of external micro frontends.

Figure 4:
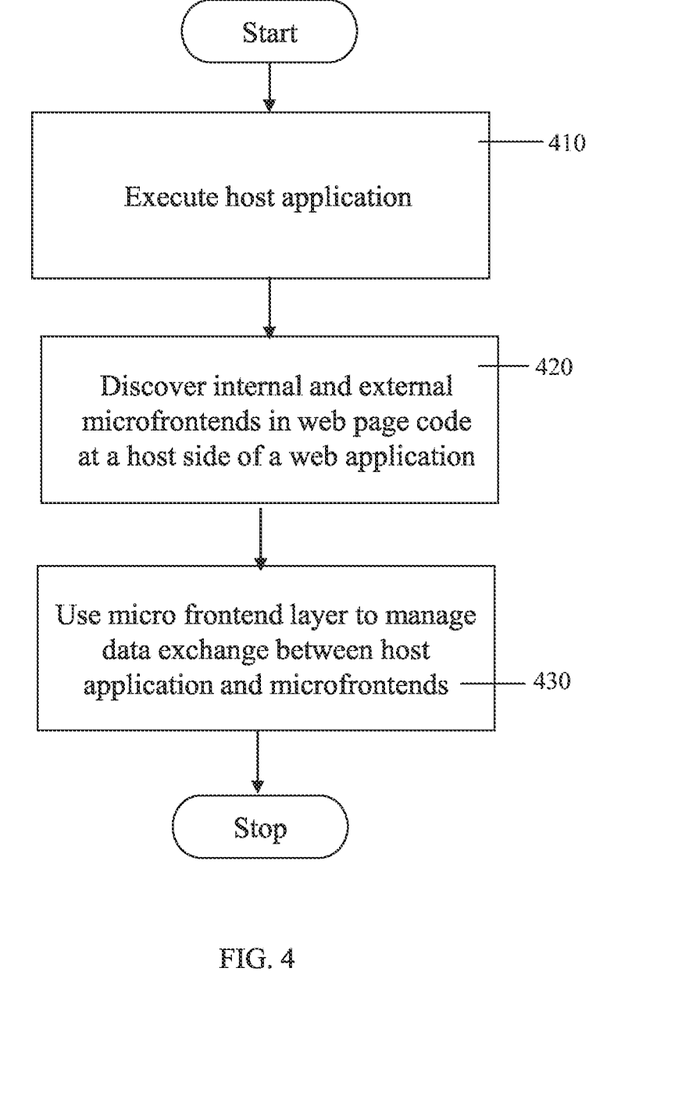
FIG. 4 is a flowchart of a method for performing for displaying a web page, according to embodiments described in the present disclosure.

Reference is also made to FIG. 4, which is a simplified flowchart of a method for displaying a web page, according to embodiments described in the present disclosure.

In 410 a host application is initialized and executed. The host application is configured to render web page(s) which may include internal MF(s) and/or external MF(s) for managing in accordance with the MF's respective type (i.e. internal or external). Optionally, host application 210 executes on a host server (hardware or virtual).

In 420 at least one internal and/or external MF is discovered in web page code at the host-side of the web application. Internal MF(s) are inline with the web page code and external MF(s) are hosted in a frame in the web page code. Optionally the MF(s) are discovered by host application 210 when the web page is accessed. In alternate optional embodiments, the MF(s) are discovered by host application 210 prior to actual access of the page by a client device, for example during an initialization phase or during idle times.

In 430, an MF layer 260 manages data exchange between the host application and the MFs, in accordance with the MFs' respective types. The MF layer runs on the host-side. Optionally, MF layer 260 runs on the host server. In alternate exemplary embodiments, MF layer 260 runs on a dedicated server in communication with the host server.

Optionally, the host application specifies respective locations on the web page for rendering internal MF(s) and external MF(s).

Optionally, the method further includes obtaining external data from a client for the external MF(s). The host application renders external MF(s) in accordance with the obtained external data.

Optionally, discovering the internal MF(s) and external MF(s) includes identifying respective most recent versions of the MFs and/or determining respective paths to the MFs.

Optionally, the method further includes using an API for communications between the host and the MFs, in accordance with the type of MF (internal or external).

Optionally, the method further includes using the API to format messages transferred between the host application and the MF based on a respective type of the MF.

Optionally, the MF layer manages privileges for at least one external MF.

Optionally, the MF layer limits access of at least one external MF to at least one capability of the host application.

Optionally, the web page is rendered for display by host application 210 and provided to a client side device (e.g. 290.1 or 290.2) over a network.

Optionally, the method further includes providing a common development tool for developing internal and external MFs. Access to at least one capability of the host application is available for development of internal MFs and blocked for development of external MFs.

Some embodiments described in the present disclosure are of a computer program including program instructions which, when executed by a processor, cause the processor to carry out the abovedescribed method.

It is expected that during the life of a patent maturing from this application many relevant APIs, host applications, micro frontends, web page codes, and databases will be developed and the scope of the term API, host application, micro frontend, web page code and database is intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A host-side system for displaying a web page, comprising:
at least one processing circuitry configured for:
discovering at least one micro frontend in web page code, each of said at least one micro frontends having a respective type, said types being internal micro frontend and external micro frontend, wherein internal micro frontends are inline with said web page code and external micro frontends are hosted in a frame in said web page code;
executing a host application configured for rendering said web page;
for each of said discovered at least one micro frontend, identifying said respective type of a respective discovered micro frontend; and
using a micro frontend layer, managing data exchange between said host application and said micro frontends, wherein said data exchange management is conducted according to said identified respective type of said each discovered micro frontend;
wherein said micro frontend layer manages at least one of privileges and access limitations of said micro frontend based on said identified respective type of said each discovered micro frontend, by preventing access of at least one external micro frontend to a group of capabilities of said host application and allowing access of the internal micro frontends to said group of capabilities of said host application.

2. The host-side system of claim 1, wherein data exchanged between said host application and external micro frontends is limited to static data only, and wherein data exchanged between said host application and internal micro frontends comprises dynamic data and/or static data.

3. The host-side system of claim 1, wherein said micro frontend layer is configured to initialize said at least one micro frontend upon said discovering.

4. The host-side system of claim 1, wherein said micro frontend layer comprises an application programming interface (API) configured to facilitate messaging amongst said host application and said at least one micro frontend in accordance with said respective type.

5. The host-side system of claim 1, wherein said at least one processing circuitry is further configured to obtain external data for rendering at least one external micro frontend from a client.

6. The host-side system of claim 1, wherein external micro frontends are identified in said web page code by at least one mark.

7. The host-side system of claim 1, wherein said web page is in HyperText Markup Language (HTML) page and external micro frontends are hosted in said code in an inline frame (iFrame) or portal.

8. The host-side system of claim 1, wherein said discovering comprises identifying respective most recent versions of said micro frontends.

9. The host-side system of claim 1, wherein said discovering comprises determining respective paths to said micro frontends.

10. The host-side system of claim 1, wherein said micro frontend layer is configured to communicate to said host whether a micro frontend is internal or external.

11. The host-side system of claim 1, wherein said micro frontend layer is configured for managing privileges for said at least one micro frontend.

12. The host-side system of claim 1, wherein said micro frontend layer is configured for limiting access of one external micro frontends to at least some capabilities of said host application.

13. The host-side system of claim 1, wherein internal micro frontends have access to all capabilities of said host application.

14. The host-side system of claim 1, wherein at least one of said micro frontends comprises an element for user interaction.

15. The host-side system of claim 1, wherein said at least one processing circuitry is further configured to render said web page for display and to provide said rendered web page to a client device over a network.

16. The host-side system of claim 1, wherein said at least one processing circuitry is further configured to provide a common development tool for developing internal and external micro frontends, and wherein access to at least one capability of said host application is available for development of internal micro frontends and blocked for development of external micro frontends.

17. A method for displaying a web page, comprising:
at a host-side of a web application, discovering at least one micro frontend in web page code, each of said at least one micro frontends having a respective type, said types being internal micro frontend and external micro frontend, wherein internal micro frontends are inline with said web page code and external micro frontends are hosted in a frame in said web page code;
executing a host application configured to render said web page;
for each of said discovered at least one micro frontend, identifying said respective type of a respective discovered micro frontend; and
using a micro frontend layer to manage data exchange between said host application and said at least one micro frontend, wherein said data exchange management is conducted according to said identified respective type of said each discovered micro frontend;
wherein said micro frontend layer manages at least one of privileges and access limitations of said micro frontend based on said identified respective type of said each discovered micro frontend, by preventing access of at least one external micro frontend to a group of capabilities of said host application and allowing access of the internal micro frontends to said group of capabilities of said host application.

18. The method of claim 17, wherein data exchanged between said host application and external micro frontends is limited to static data only, and wherein data exchanged between said host application and internal micro frontends comprises dynamic data and/or static data.

19. The method of claim 17, wherein said micro frontend layer initializes said at least one micro frontend upon said discovering.

20. The method of claim 17, wherein said host application specifies at least one location on said web page for rendering a respective micro frontend.

21. The method of claim 17, further comprising obtaining external data for at least one external micro frontend from a client, wherein said host application is configured for rendering said at least one external micro frontend for display in accordance with said external data.

22. The method of claim 17, wherein said discovering comprises at least one of: identifying respective most recent versions of said micro frontends and determining respective paths to said micro frontends.

23. The method of claim 17, wherein said managing data exchange comprises managing privileges for external micro frontends.

24. The method of claim 17, wherein said managing data exchange comprises limiting access of external micro frontends to at least one capability of said host application.

25. The method of claim 17, further comprising rendering said web page for display and providing said rendered web page to a client device over a network.

26. The method of claim 17, further comprising providing a common development tool for developing internal and external micro frontends, and wherein access to at least one capability of said host application is available for development of internal micro frontends and blocked for development of external micro frontends.

27. A computer program product comprising a non-transitory medium storing thereon computer program instructions which, when executed by a hardware processor, cause the hardware processor to:

discover at least one micro frontend in web page code, each of said at least one micro frontends having a respective type, said types being internal micro frontend and external micro frontend, wherein internal micro frontends are inline with said web page code and external micro frontends are hosted in a frame in said web page code;

execute a host application configured to render said web page;

for each of said discovered at least one micro frontend, identify said respective type of a respective discovered micro frontend; and using a micro frontend layer, manage data exchange between said host application and said at least one micro frontend, wherein said data exchange management is conducted according to said identified respective type of said each discovered micro frontend;

wherein said micro frontend layer manages at least one of privileges and access limitations of said micro frontend based on said identified respective type of said each discovered micro frontend, by preventing access of at least one external micro frontend to a group of capabilities of said host application and allowing access of the internal micro frontends to said group of capabilities of said host application.

\* \* \* \* \*